Dec. 20, 1960 T. B. ORTWIG Re. 24,913

ELECTRICAL SWITCHES

Original Filed May 24, 1954 2 Sheets-Sheet 1

INVENTOR.

THOMAS B. ORTWIG

BY

Sutherland, Polster & Taylor

ATTORNEYS

Dec. 20, 1960 T. B. ORTWIG Re. 24,913

ELECTRICAL SWITCHES

Original Filed May 24, 1954 2 Sheets-Sheet 2

INVENTOR.
THOMAS B. ORTWIG
BY
Sutherland, Polster & Taylor
ATTORNEYS

United States Patent Office

Re. 24,913
Reissued Dec. 20, 1960

24,913

ELECTRICAL SWITCHES

Thomas B. Ortwig, Florissant, Mo., assignor to James R. Kearney Corporation, St. Louis, Mo., a corporation of Missouri Original No. 2,831,079, dated Apr. 15, 1958, Ser. No. 432,521, May 24, 1954. Application for reissue Aug. 28, 1959, Ser. No. 836,840

15 Claims. (Cl. 200—48)

Matter enclosed in heavy brackets [ ] appears in the original patent but forms no part of this reissue specification; matter printed in italics indicates the additions made by reissue.

This invention relates generally to electrical switches and more specifically to an electrical switch of the tilting insulator type adapted particularly for use as a unit of a gang switch assembly, the predominant object of the invention being to provide a switch of this type which is of such improved construction and arrangement that it is capable of performing its intended function in an improved manner without the need for cables for conducting electrical energy around connections and movable parts of the switch.

*It has previously been proposed, as in Patent No. 2,140,907 to Froland, owned by the assignee of the present patent, to achieve this result by mounting between a pair of non-load-current-carrying structural pantograph members resilient current transfer rods whose ends were biased into sliding tangential contact with sleeves formed integrally with the elements between which current was to be transferred. However, the current transfer rods made only a point contact with the sleeves, and when the switch was operated, the current transfer rods slid into contact with a portion of the sleeves which had previously been exposed to the atmosphere and had usually become oxidized. The resultant increased contact resistance between the rods and the sleeves often caused overheating and burnout of the switch. The present invention has for its object to overcome this difficulty by providing annular line contacts concentric with the pivot axes of the pantograph between the structural members of the pantograph themselves as well as between the pantograph elements and the remainder of the switch, so that regardless of the position of the pantograph, current transfer always takes place at the same points of the parts involved, and that all the structural members of the pantograph are used for current transfer.*

Another object of the invention is to provide a switch of the type mentioned above with means for adjusting certain parts of the switch so that the switch will perform its intended function in a more efficient manner than did similar switches heretofore known.

Figures 1, 2:
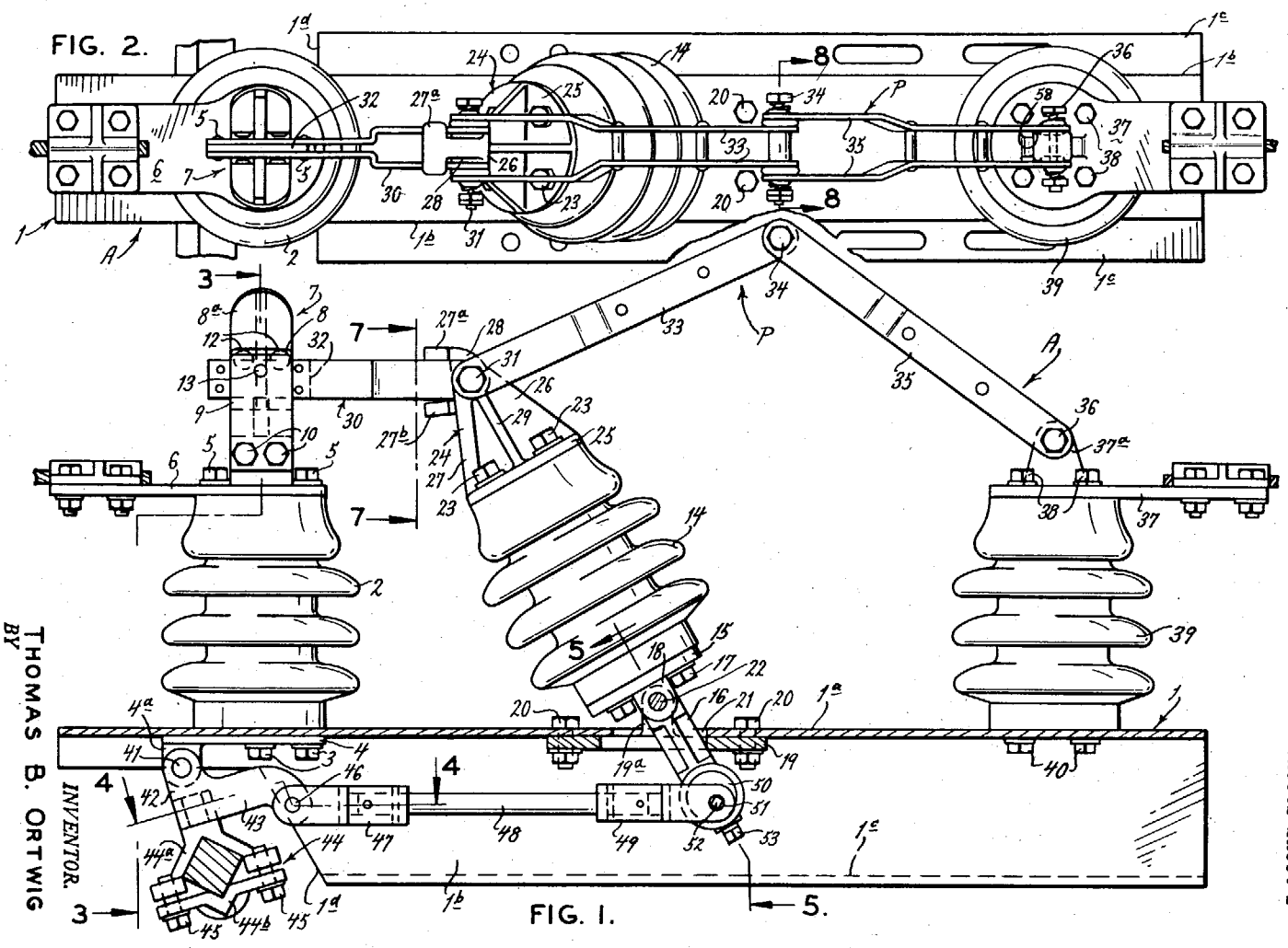
Fig. 1 is a side elevation of the improved switch of this invention.
Fig. 2 is a top, plan view of the switch shown in Fig. 1.
Figure 3:
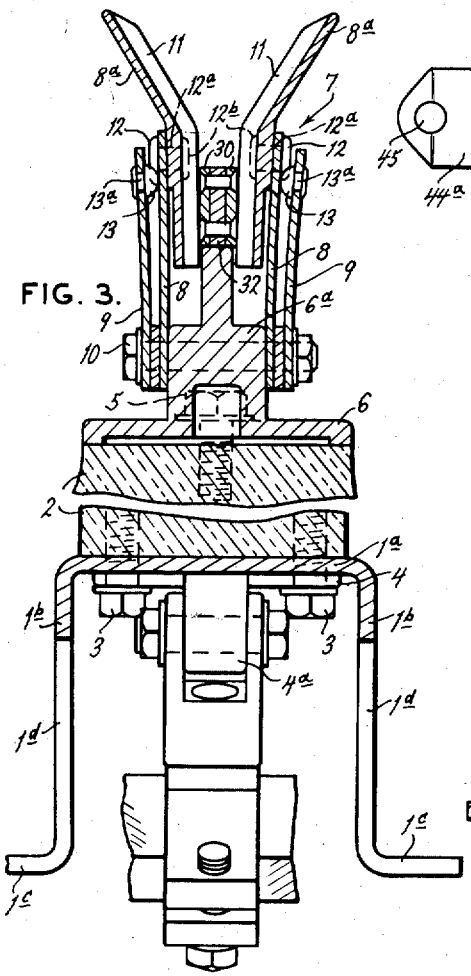
Figure 4:
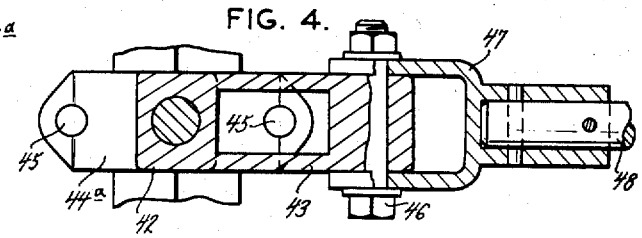
Figure 5:
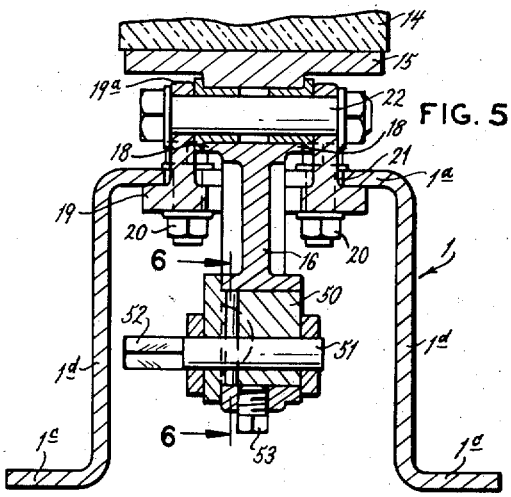
Figure 6:
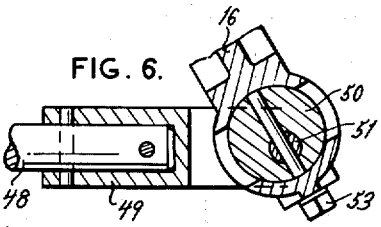

Figs. 3, 4, 5, 6, 7, and 8 are sections taken on lines 3—3, 4—4, 5—5, 7—7 of Fig. 1; line 6—6 of Fig. 5; and line 8—8 of Fig. 2.

In the drawing, wherein is shown for purposes of illustration, merely, one embodiment of the invention, A designates the improved switch generally. The switch A comprises a base member 1, said base member being of inverted U-shaped cross-section, having a top wall $1^a$, opposed side walls $1^b$, and flanges $1^c$ which project outwardly from said side walls at the bottoms thereof. At one end of the base member the side walls are cut away as indicated at $1^d$ in Fig. 1. Supported by the base member adjacent to an end thereof is an upstanding insulator 2, said insulator 2 being secured to the top wall $1^a$ of said base member by means of bolts 3, which serve also to secure to said top wall of the base member, at the lower face thereof, a bracket 4 which is provided with a downwardly extended ear $4^a$.

Fixed to the insulator 2 at the top thereof by means of bolts 5 is a terminal 6, said terminal having an upwardly projected extension $6^a$. The extension $6^a$ of the terminal 6 supports a contact structure 7 which comprises a pair of inner contact members 8 which are formed of material possessing some resiliency, and a pair of spring members 9 which are formed of highly resilient material, there being a contact member 8 and a spring member 9 at each side of the contact structure 4 and said opposed pairs made up each of a contact member and a spring member being secured to the extension $6^a$ of the terminal 6 by bolts 10. The contact members are each provided with an upper element $8^a$ and said upper element is provided with an inwardly projected rib 11. Also, each contact member has fixedly associated therewith a plurality of rivets 12, each of said rivets having a portion $12^a$ of reduced diameter which is force fitted in an aperture formed in the upper element of contact member, and a portion $12^b$ of larger diameter which contacts with the outer face of the contact member for securing said upper element to said contact member 8. Each spring member 9 of the contact structure 7 is provided with a rivet 13 which is provided with a portion $13^a$ of reduced diameter which is force fitted in an aperture formed in the spring member, a portion of larger diameter of each rivet 13 being in contact with the inner face of the spring member with which it is associated and contacts with the related contact member.

The base member 1 supports also a movable insulator 14 which is provided at its bottom with a plate 15 that has extended downwardly therefrom an arm 16, and said plate being secured to said insulator 14 by bolts 17. At opposite sides of the arm 16 bearing portions 18 are provided which are disposed between spaced ears $19^a$ formed on a bracket member 19, said bracket member being secured to the top wall of the base member at the lower face thereof by bolts 20 and the spaced ears thereof being projected through an opening 21 formed through said top wall of said base member. The movable insulator 14 is connected for pivotal movement to the bracket member 19 by a pivot pin 22, and fixed to said insulator 14 at the top thereof, by bolts 23, is a member 24, said member comprising a plate 25, and a convergent portion 26 which extends upwardly from said plate, said convergent portion having a forward wall 27 from which extend an upper abutment element $27^a$ and a lower abutment element $27^b$. The convergent portion 26 of the member 24 is provided with a bearing portion 28, and said convergent portion is provided with strengthening ribs 29 for imparting thereto the required strength.

Figure 7:
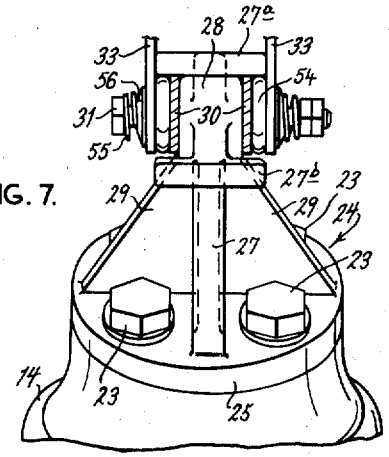
Figure 8:
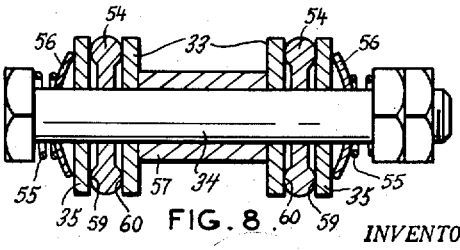

The improved switch A includes a switch blade 30 which is secured to the convergent portion 26 of the member 24 by means of a bolt 31. The switch blade is made up of a pair of blade members, the forward portions of said blade members being slightly spaced apart with a spacer 32 interposed between said forward portions of said blade members, and said forward portions of said blade members being riveted together. The rear portions of said blade members are more widely spaced apart, said rear portions of said blade members being disposed in contact with the opposite ends of the bearing 28 of the convergent portion of the member 24. The switch A includes pantograph structure P comprising a pair of arms 33 which are pivotally connected at corresponding ends thereof to the convergent portion of the member 24, the shank portion of a bolt 34 being extended through openings formed through end portions of said arms 33, through end portions of the blade members of the switch blade 30, and through the bore of the bearing portion of the convergent portion 26 of said member 24, the bore of said bearing portion being substantially larger in diameter than the shank portion of said bolt so that a loose fit is provided between said bolt shank and said bearing portion. The pantograph structure includes, also, a second pair of arms 35 which are pivotally connected at corresponding ends to the roof end portion of the pair of arms 33 which are remote from the end portions of said arms 33 which are connected to the convergent portion 26 of the member 24 by the bolt 31. The opposite end portions of the arms 35 are pivotally connected by means of a bolt 36 to an upstanding ear 37[a] formed on a terminal 37, said terminal being secured by bolts 38 to the top of an insulator 39 which insulator is secured in a fixed position to the base member 1 by bolts 40. *Current transfer from terminal 37 to blade 30 is accomplished in the following manner: From the upstanding ear 37*[a] *of terminal 37, current is transferred from the annular contact faces 58 of ear 37*[a] *(Fig. 2) to the inside faces of structural members or arms 35. Members 35 are biased into firm contact with faces 58 by coil springs 55 and cupped washers 56 mounted on bolt 36. From the other end of members 35, current is transferred to the outer annular contact surfaces 59 of silvered washers 54, which are bone-shaped in cross-section as best shown in Fig. 8. From washers 54, current is transferred through the inner annular contact surfaces 60 of washers 54 to the outer faces of structural members 33. Members 33 are kept properly spaced by a sleeve 57, and members 35 are biased toward members 33 by spring washers 56 and coil springs 55, so as to insure that washers 54 are adequately compressed between members 35 and 33 for optimum current transfer. From the blade end of members 33, current then travels through another set of silvered washers 54 to the outside faces of blade elements 30, which are kept spaced by the bearing 28 (Fig. 7). Coil springs 55 and spring washers 56 are provided on each end of bolt 31 to bias elements 30, 54, and 33 into firm contact with each other. It will be seen that with this arrangement, the structural members can be freely rotated about pivot points 31, 34, and 36 without changing the path of current transfer. Furthermore, it will readily be recognized that there is at least a line contact at each location where current is transferred from one element to another.*

Pivotally connected to the ear 4[a] of the bracket 4 of the switch A by means of a pivot pin 41 is an element 42, said element being provided with an extension 43 and including, also, a clamping structure 44 made up of a fixed clamping jaw 44[a] and a removable clamping jaw 44[b] which is fixed to the fixed jaw by bolts 45. Connected to the extension 43 of the element 42, at the outer end thereof by means of a pivot pin 46 is a bifurcated fitting 47 which embraces the end portion of the extension 43 of the element 42, said fitting having a rod 48 connected thereto and having a similar bifurated fitting 49 connected to its opposite end. The arm 16 which extends downwardly from the plate 15 at the bottom of the movable insulator 14 includes at its lower end an eccentric housing in which is disposed an eccentric 50, said eccentric being mounted on a shaft 51 which is arranged eccentrically of said eccentric housing, said shaft having a non-circular, tool-receiving, end 52, as shown in Fig. 1 and serving also to connect the fitting 49 to the eccentric 50. When the switch A is a part of a gang switch assembly a phate bar (not shown) is clamped by the clamp structures 44 of the various switch units to provide for the operation of said various switch units in response to movement of said phase bar.

When the switch units of a gang switch assembly are moved from the close-switch position to the open-switch position, the phase bar is actuated to cause the bar 48 and fittings 47 and 48 to be moved in the direction indicated by the arrow in Fig. 1. Such movement of said parts will cause the movable insulator 14 to tilt on its pivot 22, so as to cause the switch blade to be disconnected from the contact structure 7. As heretofore stated, the bore opening through the bearing portion of the convergent portion 26 of the member 24 is oversize when compared with the diameter of the shank of the bolt 31 and, therefore, relative movement is permitted between the switch blade and the movable insulator. This is important when ice forms at the point where the switch blade 30 engages the contact structure 7 and it is necessary to work the switch blade free from the contact structure by movements of the switch blade which will crack the ice. When the movable insulator 14 of the switch is being moved to the open-switch position of the switch, the lower abutment 27[b] engages the lower edges of the blade members of the switch blade so as to carry the switch blade with the movable insulator of the switch. Likewise, when the movable insulator 14 of the switch is being moved to the close-switch position of the switch the upper abutment 27[a] engages the top edges of the blade members of the switch blade so as to carry the switch blade into contact engagement with the contact structure 7 of the switch.

It frequently happens that the phase bar of a gang switch assembly becomes warped, or is otherwise bent out of its true alinement, and when this happens proper contact engagement between the switch blade 30 and the contact structure 7 may be prevented. In the use of the present invention if this should happen it is necessary, merely, that the lock bolt 53 which frictionally engages and locks the eccentric in positions to which it has been adjusted with respect to the eccentric housing, be backed up slightly so as to unlock said eccentric, whereupon a suitable tool may be applied to the non-circular, tool-receiving portion 52 of the eccentric shaft 51 and the eccentric rotated within the eccentric housing to bring the switch blade 30 into proper relation with respect to the contact structure 7.

An important feature of the present invention is that the pairs of arms 33 and 35 of which the pantograph P is comprised are constructed of copper or other material which is a good conductor of electricity. Because of this arrangement *and because of my novel line-contact joints,* the need for cable connections for conducting current around the pantograph, as was the case heretofore, when the arms of the pantograph were made of steel or other material which did not possess good electrical conducting properties, is eliminated.

I claim:

1. An electrical switch comprising a base member, a first fixed insulator secured to said base member, a contact structure supported by said first fixed insulator and having a terminal related thereto which has an extension that supports said contact structure, a movable insulator supported by said base member and having a member secured thereto at the top of said movable insulator, a switch blade supported by said top member of said movable insulator for movement with respect thereto, and for movement with said movable insulator into and out of contact engagement with respect to said contact structure, a bolt for securing said switch blade to said top member of said movable insulator, and a bearing forming a part of said top member of said movable insulator through which the shank of said bolt extends, the bore of said bearing being substantially larger in diameter than said shank of said bolt to permit limited omnidirectional planar movement of the switch blade relative to the top member of said movable insulator, a second fixed insulator secured to said base member and having a terminal supported thereby, and a pantograph structure made up of arms electrically connected to the switch blade of said movable insulator and to the terminal of the second fixed insulator and connected together.

2. An electrical switch comprising a base member, a first fixed insulator secured to said base member, a contact structure supported by said first fixed insulator and having a terminal related thereto which has an extension that supports said contact structure, a movable insulator supported by said base member and having a member secured thereto at the top of said movable insulator, a switch blade supported by said top member of said movable insulator for movement with respect thereto, and for movement with said movable insulator into and out of contact engagement with respect to said contact structure, a bolt for securing said switch blade to said top member of said movable insulator, and a bearing forming a part of said top member of said movable insulator through which the shank of said bolt extends, the bore of said bearing being substantially larger in diameter than said shank of said bolt to permit limited omnidirectional planar movement of the switch blade relative to the top member of said movable insulator, abutments formed on said top member of said movable insulator which engage said switch blade on movement of said movable insulator, a second fixed insulator secured to said base member and having a terminal supported thereby, and a pantograph structure made up of arms electrically connected to the switch blade of said movable insulator and to the terminal of the second fixed insulator and connected together.

3. An electrical switch comprising a base member, a first fixed insulator secured to said base member, a contact structure supported by said first fixed insulator and having a terminal related thereto, a movable insulator supported by said base member and having a member secured thereto at the top of said movable insulator, a switch blade supported by said top member of said movable insulator for movement with respect thereto and for movement with said movable insulator into and out of contact engagement with respect to said contact structure, a second fixed insulator secured to said base member and having a terminal supported thereby, means located beneath said base member for adjusting said movable insulator to properly relate the switch blade to said contact structure, and a pantograph structure made up of arms electrically connected to said switch blade of said movable insulator and to the terminal of the second fixed insulator and connected together.

4. An electrical switch comprising a base member, a first fixed insulator secured to said base member, a contact structure supported by said first fixed insulator and having a terminal related thereto, a movable insulator supported by said base member and having a member secured thereto at the top of said movable insulator, a switch blade supported by said top member of said movable insulator, for movement with respect thereto and for movement with said movable insulator into and out of contact engagement with respect to said contact structure, a second fixed insulator secured to said base member and having a terminal supported thereby, means located beneath said base member including an eccentric for adjusting said movable insulator to properly relate the switch blade to said contact structure, and a pantograph structure made up of arms electrically connected to said switch blade of said movable insulator and to the terminal of the second fixed insulator and connected together.

5. An electrical switch comprising a base member, a first fixed insulator secured to said base member, a contact structure supported by said first fixed insulator and having a terminal related thereto, a movable insulator supported by said base member and having a member secured thereto at the top of said movable insulator, a switch blade supported by said top member of said movable insulator for movement with respect thereto and for movement with said movable insulator into and out of contact engagement with respect to said contact structure, a second fixed insulator secured to said base member and having a terminal supported thereby, means located beneath said base member including an eccentric adjacent to the lower end of said movable insulator for adjusting said movable insulator to properly relate the switch blade to said contact structure, and a pantograph structure made up of arms electrically connected to said switch blade of said movable insulator and to the terminal of the second fixed insulator and connected together.

6. An electrical switch comprising a base member, a first fixed insulator secured to said base member, a contact structure supported by said first fixed insulator and having a terminal related thereto, a movable insulator supported by said base member and having a member secured thereto at the top of said movable insulator, a switch blade supported by said top member of said movable insulator for movement with respect thereto and for movement with said movable insulator into and out of contact engagement with respect to said contact structure, a second fixed insulator secured to said base member and having a terminal supported thereby, means located beneath said base member including an eccentric for adjusting said movable insulator to properly relate the switch blade to said contact structure, and means for locking said eccentric in positions to which it is adjusted, and a pantograph structure made up of arms electrically connected to said switch blade of said movable insulator and to the terminal of the second fixed insulator and connected together.

7. In an electrical switch having a fixed insulator supporting a contact structure, and a pivotally movable insulator having a supporting structure for a switch blade, the improvement comprising a shaft mounted on said supporting structure, a switch blade having an aperture substantially larger in diameter than said shaft, said shaft being positioned within said aperture so as to allow limited free omnidirectional planar movement of said switch blade, and means for maintaining frictional contact between said supporting structure and said switch blade during relative movement thereof.

8. The improvement of claim 7, further comprising at least one abutment rigidly connected to said supporting structure for limiting movement of said switch blade.

*9. A high potential switch comprising a first fixed insulator supporting a contact, a second fixed insulator supporting a terminal, a movable insulator supporting a switch blade for movement into and out of engagement with said contact, and a pantograph structure having articulately joined structural members mounted on said second insulator and on said movable insulator and electrically connecting said terminal and said switch blade, a relatively incompressible electrical connecting member between at least two articulately joined ones of said structural members at their joint for establishing at least a line contact between said members so as to permit high current transfer between them, and biasing means for urging said members toward each other, said biasing means being on the opposite side of one of said structural members from said electrical connecting member.*

*10. A high potential switch comprising a first fixed insulator supporting a contact, a second fixed insulator supporting a terminal, a movable insulator supporting a switch blade for movement into and out of engagement with said contact, and a pantograph structure mounted on said second insulator and on said movable insulator and electrically connecting said terminal and said switch blade, said pantograph having structural members having flat portions and an articulate joint, a relatively incompressible electrical connecting member in the form of a washer at said joint intermediate two articulately joined ones of said structural members, said washer contacting said flat portions of said two of said structural members and being so shaped as to make at least the same circular line contact with each of said structural members, and biasing means for urging said structural members toward each other said biasing means being on the opposite side of one of said structural members from said washer.*

*11. The device of claim 10, further comprising a third structural member parallel to one of said two of said structural members, and spacing means for maintaining a predetermined separation between said one of said two of said structural members and said third structural member.*

*12. A high potential switch comprising a first fixed insulator supporting a contact, a second fixed insulator supporting a terminal, a movable insulator supporting a switch blade for movement into and out of engagement with said contact, and a pantograph structure having articulately joined structural members mounted on said second insulator and on said movable insulator and an electrical connecting member between at least two articulately joined ones of said structural members at their joint for establishing at least a line contact with equal contact area on both sides between said electrical connecting member and said structural members so as to permit high current transfer between them, and biasing means for urging said members toward each other, said biasing means being on the opposite side of one of said structural members from said electrical connecting member.*

*13. A high potential switch comprising a first fixed insulator supporting a contact, a second fixer insulator supporting a terminal, a movable insulator supporting a switch blade for movement into and out of engagement with said contact, and a pantograph structure having articulately joined structural members mounted on said second insulator and on said movable insulator and an electrical connecting member between at least two articulately joined ones of said structural members at their joint for establishing at least a substantially continuous line contact at substantially the same radius from the axis of said joint on both sides thereof between said electrical connecting member and said structural members so as to permit high current transfer between them, and biasing means for urging said members toward each other, said biasing means being on the opposite side of one of said structural members from said electrical connecting member.*

*14. A high potential switch comprising a first fixed insulator supporting a contact, a second fixed insulator supporting a terminal, a movable insulator supporting a switch blade for movement into and out of engagement with said contact, and a pantograph structure having articulately joined structural members mounted on said second insulator and on said movable insulator and an electrical connecting member between at least two articulately joined ones of said structural members at their joint with opposite arcuately contoured faces extending in a circle for establishing circular line contact between said electrical connecting member and each of said structural members so as to permit high current transfer between said electrical connecting member and said structural members, and biasing means for urging said members toward each other, said biasing means being on the opposite side of one of said structural members from said electrical connecting member.*

*15. The combination as defined in claim 10, in which said washer has opposite convex arcuate shaped faces to form circular contact areas of the same diameter on each radial face of said washer and said opposite convex arcuate faces on said washer contact said flat portions of said two structural members to make the said circular line contact with each of said structural members.*

References Cited in the file of this patent or the original patent

UNITED STATES PATENTS

| | | |
|---|---|---|
| 1,831,843 | Cornfield | Nov. 17, 1931 |
| 1,894,421 | Rea | Jan. 17, 1933 |
| 2,047,083 | Sandt | July 7, 1936 |
| 2,140,907 | Froland | Dec. 20, 1938 |
| 2,193,122 | Crabbs | Mar. 12, 1940 |
| 2,208,411 | Crabbs | July 16, 1940 |
| 2,211,161 | Ramsey | Aug. 13, 1940 |
| 2,354,991 | Gusson et al. | Aug. 1, 1944 |
| 2,359,055 | Schwager et al. | Sept. 26, 1944 |
| 2,760,034 | Kowalski et al. | Aug. 21, 1956 |
| 2,836,688 | Florschutz | May 27, 1958 |
| 2,895,033 | Favre | July 14, 1959 |